United States Patent

Husemann et al.

(10) Patent No.: US 6,703,073 B2
(45) Date of Patent: *Mar. 9, 2004

(54) POLAR ACRYLIC PRESSURE-SENSITIVE ADHESIVE COMPOSITIONS

(75) Inventors: Marc Husemann, Hamburg (DE); Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/774,491

(22) Filed: Jan. 31, 2001

(65) Prior Publication Data

US 2001/0025063 A1 Sep. 27, 2001

(30) Foreign Application Priority Data

Feb. 25, 2000 (DE) .......................................... 100 08 843

(51) Int. Cl.[7] .............................. C08F 2/46; C08F 2/48; C08F 8/00
(52) U.S. Cl. .................. 427/208.4; 427/508; 427/510; 427/516; 427/207.1; 427/208; 522/153; 522/150; 522/178; 522/179; 522/182; 522/113; 522/114; 522/121; 523/105; 523/111
(58) Field of Search .......................... 430/270; 522/178, 522/179, 182, 184, 25, 31, 153, 150, 113, 114, 121; 427/508, 510, 208, 516, 207.1, 208.4; 523/105, 111; 526/317.1, 314, 319, 320, 321.1, 323.1, 931

(56) References Cited

U.S. PATENT DOCUMENTS

| | | | |
|---|---|---|---|
| 4,077,926 A | * 3/1978 | Sanderson et al. | .... 260/29.6 TA |
| 4,491,628 A | 1/1985 | Ito et al. | .............. 430/176 |
| 4,713,412 A | * 12/1987 | Czerpinski et al. | ......... 524/833 |
| 4,759,983 A | * 7/1988 | Knutson et al. | ............. 428/343 |
| 4,810,613 A | 3/1989 | Osuch et al. | ............... 430/192 |
| 4,883,740 A | 11/1989 | Schwalm et al. | ........... 430/270 |
| 4,900,624 A | 2/1990 | Chen | ........................ 428/343 |
| 4,968,581 A | 11/1990 | Wu et al. | ................... 430/192 |
| 4,968,740 A | * 11/1990 | Makati et al. | ............. 524/501 |
| 5,047,443 A | 9/1991 | Rehmer | ...................... 522/46 |
| 5,049,416 A | * 9/1991 | Wilczyski | ................ 427/208.4 |
| 5,053,452 A | * 10/1991 | Spada et al. | ................ 524/707 |
| 5,071,730 A | * 12/1991 | Allen et al. | .................. 430/270 |
| 5,073,611 A | 12/1991 | Rehmer et al. | ............. 526/208 |
| 5,194,455 A | 3/1993 | Massow et al. | ............. 522/152 |
| 5,230,984 A | * 7/1993 | Tachiki et al. | .............. 430/270 |
| 5,302,629 A | * 4/1994 | Berejka | ..................... 523/111 |
| 5,372,912 A | * 12/1994 | Allen et al. | ................. 430/270 |
| 5,861,231 A | 1/1999 | Barclay et al. | ......... 430/270.1 |
| 5,910,392 A | 6/1999 | Nozaki et al. | ........... 430/270.1 |

FOREIGN PATENT DOCUMENTS

| | | |
|---|---|---|
| DE | 27 43 979 B2 | 4/1979 |
| EP | 0343 267 B1 | 11/1989 |
| EP | 0 594 109 A1 | 4/1994 |
| EP | 0 660 187 A1 | 6/1995 |
| WO | WO 92/15394 | 9/1992 |
| WO | WO 93/13147 | 7/1993 |
| WO | WO 96/35725 | 11/1996 |
| WO | WO 97/31077 | 8/1997 |

OTHER PUBLICATIONS

WPIDS Abstract: 1994—023079/03 zu JP 05331426 A.

* cited by examiner

*Primary Examiner*—Samuel A. Acquah
*Assistant Examiner*—Sanza L. McClendon
(74) *Attorney, Agent, or Firm*—Norris McLaughlin & Marcus

(57) ABSTRACT

Crosslinked polyacrylates obtained by crosslinking, induced by means of UV radiation, of a polymer mixture comprising
a) polyacrylate copolymers of the following monomers
  a1) acrylic acid and/or acrylic esters of the following formula $CH_2=CH(R^1)(COOR^2)$, where $R^1=H$ or $CH_3$ and $R^2$ is an alkyl chain having 1–20 carbon atoms, at 70–99% by weight, based on component (a),
  a2) olefinically unsaturated monomers containing functional groups,
    at 0–15% by weight, based on component (a),
  a3) tert-butyl acrylate,
    at 1–15% by weight, based on component (a), and
b) a photocationic initiator
  at 0.01–25% by weight, based on the overall polymer mixture.

9 Claims, 1 Drawing Sheet

POLAR ACRYLIC PRESSURE-SENSITIVE ADHESIVE COMPOSITIONS

Figure 1:
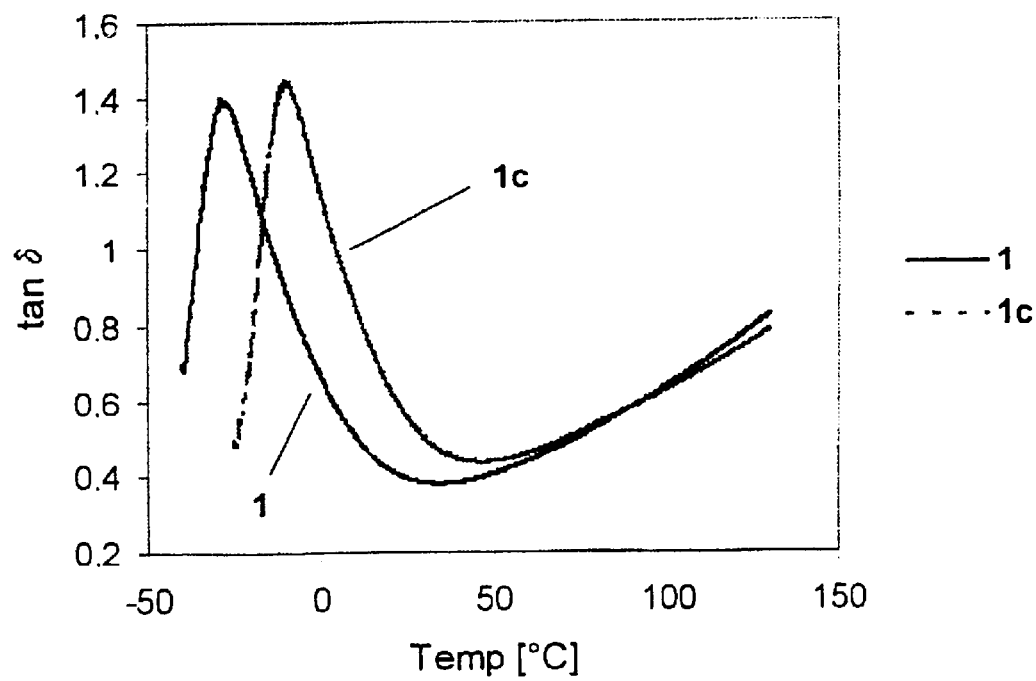

The invention relates to a polyacrylate which can be prepared by way of the conversion of nonpolar into polar functional groups by crosslinking by means of UV light and temperature, to a process for preparing this polyacrylate, and to the use of this polymer mixture as a pressure-sensitive adhesive composition.

In the field of pressure-sensitive adhesive (PSA) compositions, ongoing technological developments in the coating technique mean that there is a progressive need for new developments. Within the industry, hotmelt processes with solventless coating technology are of increasing importance in the preparation of PSA compositions, since the environmental regulations are becoming ever greater and the prices of solvents continue to rise. The consequence of this is that solvents are to be eliminated as far as possible from the manufacturing process for PSA tapes. The associated introduction of the hotmelt technology is imposing ever greater requirements on the adhesive compositions. Acrylic PSA compositions in particular are the subject of very intensive investigations aimed at improvements. For high-level industrial applications, polyacrylates are preferred on account of their transparency and weathering stability. In addition to these advantages, however, these acrylic PSA compositions must also meet stringent requirements in respect of shear strength and bond strength. This profile of requirements is met by polyacrylates of high molecular weight and high polarity with subsequent efficient crosslinking. These high shear strength, polar PSA compositions possess the disadvantage, however, that they are unsuited to the hotmelt extrusion process, because high application temperatures are necessary and because furthermore, the molecular weight of the polymer is reduced by shearing in the extruder. This damage significantly lowers the level of the adhesive properties. The bond strength and the tack are generally low, since owing to the polar fractions in the adhesive compositions the glass transition temperature is relatively high. The shear strengths of the hotmelt-coated acrylic PSA compositions, in particular, fall distinctly in comparison to the original, solvent-coated PSA composition. At the present time, therefore, different concepts aimed at reducing the flow viscosity and thereby facilitating extrusion coating of these PSA compositions are being investigated.

The industry is pursuing a variety of concepts for achieving this objective. One possibility is the highly efficient crosslinking of a low-viscosity, nonpolar acrylic adhesive composition only when it is actually on the backing. Acrylates containing electron-donating groups are copolymerized and, during crosslinking by UV or EBC (EBC: electron beam curing), they stabilize free radicals that are formed. Examples thereof are tertiary amine monomers [WO 96/35725], tertiary butylacrylamide monomer [U.S. Pat. No. 5,194,455] and the tetrahydrofurfuryl acrylates cited and used in EP 0 343 467 B1. A further efficient crosslinking concept is the copolymerization of UV photoinitiators into the polyacrylate chain. For example, benzoin acrylate has been used as a comonomer and the crosslinking has been conducted on the backing using UV light [DE 27 43 979 A1]. In U.S. Pat. No. 5,073,611, on the other hand, benzophenone and acetophenone were used as copolymerizable monomers.

An entirely new method has come from chip manufacture. By adding a photocationic initiator and carrying out irradiation with UV light, polymers containing ester functions are deprotected and free carboxylic acids or hydroxyl functions are generated. This method was described in U.S. Pat. No. 4,491,628. More recent developments have dealt with the change in the UV light wavelength to 193 nm [U.S. Pat. No. 5,910,392] and with the improvement in resolution [U.S. Pat. No. 5,861,231; U.S. Pat. No. 4,968,581; U.S. Pat. No. 4,883,740; U.S. Pat. No. 4,810,613; U.S. Pat. No. 4,491,628].

It is an object of the invention to provide a polyacrylate which can be prepared from a starting polymer of low processing viscosity and which is converted into a composition of high shear strength only after processing, e.g., in a hotmelt process. Through an appropriate choice of the reaction parameters during the conversion reaction, the intention is that it should be possible to adjust the physical properties of the polymer. The reaction causing the conversion should be able to be conducted when the polymer composition is already present in its ultimate form: for example, applied as an adhesive composition on a backing.

This object is achieved by means of a polyacrylate in accordance with the main claim. The subclaims relate to advantageous developments of the invention and to a process for preparing the polyacrylate, and also to its use.

The invention accordingly provides crosslinked polyacrylates prepared by crosslinking, induced by means of UV radiation, of a polymer mixture comprising the following components:

a) polyacrylate copolymers of the following monomers
  a1) acrylic acid and/or acrylic esters of the following formula

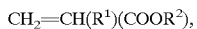
  $CH_2=CH(R^1)(COOR^2)$, where $R^1$=H or $CH_3$ and $R^2$ is an alkyl chain having 1–20 carbon atoms, at 70–99% by weight, based on component (a),
  a2) olefinically unsaturated monomers containing functional groups, at 0–15% by weight, based on component (a),
  a3) tert-butyl acrylate,
    at 1–15% by weight, based on component (a), and
b) a photocationic initiator
    at 0.01–25% by weight, based on the overall polymer mixture.

In a particularly advantageous embodiment, component (a1) is present at 85–89% by weight, based on component (a), and/or component (a2) is present at 4–6% by weight, based on component (a), and/or component (a3) is present at 7–9% by weight, based on component (a).

It is very advantageous to use a polymer mixture to which up to 3% by weight, based on the overall polymer mixture, of c) a difunctional or polyfunctional crosslinker is added.

Crosslinkers which can be used here are all difunctional or polyfunctional compounds whose functional groups are able to enter into a linking reaction with the polyacrylates, especially addition polymerization, polycondensation or polyaddition reactions. Preferably, these reactions will take place on a carboxyl group. Particularly suitable crosslinkers are epoxides or isocyanates containing at least two functional groups, although all other compounds which react with carboxyl groups are also suitable. It is also possible to use metal chelate compounds for this purpose.

The invention further provides a process for preparing a polyacrylate, which comprises applying the polymer mixture to a backing material and crosslinking it on said backing material by irradiation with UV light.

The invention further provides for the use of the polyacrylate as claimed in any of the above claims as a pressure-sensitive adhesive composition, especially its use as a pressure-sensitive adhesive composition for an adhesive tape, where the acrylic pressure-sensitive adhesive composition is present as a single- or double-sided film on a backing sheet.

As backing materials, for adhesive tapes, for example, it is possible in this context to use the materials customary and familiar to the skilled worker, such as sheets (polyester, PET, PE, PP, BOPP, PVC), nonwovens, wovens and woven sheets, and also release paper if desired. This list is not intended to be conclusive.

The invention set out above makes it possible to achieve the stated objects. A polymer mixture is presented which is present in low-viscosity form during processing and in which the shear strength can be increased after it has been applied, for example, to a backing, this increase in shear strength being achieved by converting nonpolar into polar groups. The flow viscosity of the starting polyacrylates is very low and is therefore highly suitable for the hotmelt process, for example.

The principles of the invention are set out below. The starting polymers may be prepared by a free radical polymerization, and the molecular weight is of the order of 1,000,000. For the starting polymer mixture it is possible to use any polymer which has adhesive properties in accordance with the Handbook of Pressure-sensitive Adhesives, p. 172, §1, 1989. As an essential component for the deprotection reaction which is to take place subsequently, polymers prepared using tert-butyl acrylate as comonomer must be present, since the conversion of the nonpolar into polar groups is based on the replacement of the tert-butyl group by protons.

The chemical reaction whose consequence is to convert nonpolar into polar PSA compositions on the backing is a deprotection of the tert-butyl acrylate to give the free carboxylic acid, in the presence of protons, and has already been known for a long time [Loev, Chem. Ind. (London) 193 (1964)].

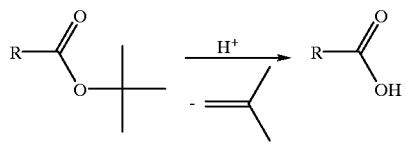

This reaction is used in the photoresist technology (photoresists: light-sensitive, film-forming materials whose solubility behavior alters by exposure to light or other irradiation; in the case of negative working photoresists, this takes place by crosslinking or photopolymerization) for the deprotection of tert-butyl groups. In that technology, the acid is produced by the UV irradiation of an admixed photocationic initiator.

In the context of this invention, this technology has been transferred to PSA compositions.

Cationic photoinitiators are typically aryidiazonium salts ("onium salts") which may be represented in general by the formula Ar—N=N$^+$ LX$^-$, where LX$^-$ is an adduct of a Lewis acid L and a Lewis base X$^-$. Particularly advantageous for LX$^-$ are BF$_4^-$, SbF$_5^-$, AsF$_5^-$, PF$_5^-$, SO$_3$CF$_2^-$. Under the influence of UV radiation, there is rapid cleavage of the molecule into the aryl halide (ArX), nitrogen, and the corresponding Lewis acid. Diaryliodonium salts $(C_6H_5)_2I^{3\oplus}$ LX$^-$ and triarylsulfonium salts $(C_6H_5)_3S^+$ LX$^-$ are also known for use as cationic photoinitiators; in the presence of proton donors, they form strong (Bronstedt) acids which are likewise highly suitable for the initiation of cationic polymerizations.

Sulfonium salts as cationic photoinitiators are also present, for example, in the form of the compounds H$_5$C$_6$—CO—CH$_2$—S$^+$ LX$^-$ or H$_5$C$_6$—CO—CH$_2$—Pyr$^+$ LX$^-$, in which Pyr is a nitrogen-containing heteroaromatic system (e.g. pyridine, pyrimidine).

For the crosslinking reaction depicted, the photocationic initiators familiar to the skilled worker are used, preferably one of the initiators from the group set out in the above paragraph.

EXAMPLES

The following exemplary experiments are intended to illustrate the content of the invention; there is no intention to restrict the invention unnecessarily by the choice of the examples.

Test Methods

The polyacrylate compositions and their crosslinked products were characterized using the test methods described below:

Sheer Strength (Test A1, A2,A3)

A 13 mm wide strip of the adhesive tape was applied to a smooth and cleaned steel surface. The application area was 20 mm×13 mm (length×width). The subsequent procedure was as follows:

Test A1: At room temperature, a 1 kg weight was fastened to the adhesive tape and the time which elapsed until the weight fell off was measured.

Test A2: At 70° C., a 0.5 kg weight was fastened to the adhesive tape and the time which elapsed until the weight fell off was measured.

The measured shear stability times are each reported in minutes and correspond to the average of three measurements.

Dynamic Mechanical Analysis, DMA (Test B)

The measurements were conducted using the dynamic stress rheometer instrument from Rheometrics. The mechanical loss factor tan δ as a function of the frequency was monitored in an interval from 0.1 to 100 rad/s at 25° C. It was measured using a parallel plate arrangement.

IR Spectroscopy (Test C)

The measurements were carried out on a Bruker IFS 45. The fraction of acrylic acid produced was quantified by means of a calibration plot.

Rolling Ball (Test D)

A 25 mm wide adhesive strip is placed on a measurement rail with the side bearing the adhesive composition under test in contact with the rail. By releasing the locking device, a V2A steel measuring ball with a diameter of 11 mm rolls down the ramp and along a horizontal area coated with the adhesive composition.

The distance run on the adhesive film, in mm, serves as a measure of the tack.

Samples Investigated

The samples used for the experiments were prepared as follows:

The polymers were prepared conventionally by way of a free radical polymerization; the average molecular weight was approximately 1,000,000. As the second component, a UV-cationic initiator was admixed. Photoinitiators known to the skilled worker were used for photochemically initiated polymerizations.

EXAMPLE 1

A 2 L glass reactor conventional for radical polymerizations was filled with 36 g of tert-butyl acrylate, 40 g of methyl acrylate, 324 g of 2-ethylhexyl acrylate and 266 g of acetone/isopropanol (97:3). After nitrogen gas had been passed through the reaction solution with stirring for 45 minutes, the reactor was heated to 58° C. and 0.4 g of AIBN [2,2'-azobis(2-methylbutyronitrile)] was added. Subsequently, the external heating bath was heated to 75° C. and the reaction was conducted constantly at this external temperature. Dilution was carried out after 4 and 6 h with acetone/isopropanol mixture (150 g in each case). After a reaction time of 36 h, the polymerization was terminated and the reaction vessel was cooled to room temperature. The polymer was subsequently applied at 50 g/m² to PET sheet and, respectively, release paper, cured with electron beams and then subjected to adhesive testing using Tests A, B and D.

EXAMPLE 1c

The procedure of Example 3c was used. 400 g of the adhesive composition 1 (50% strength solution) were mixed and homogenized with 17.8 g of triarylsulfonium hexafluorophosphate (Cyracure UVI-6990 ® [UNION CARBIDE]; 50% strength solution).

EXAMPLE 2

The procedure of Example 1 was used. For the polymerization, 20 g of tert-butyl acrylate, 80 g of methyl acrylate and 300 g of 2-ethylhexyl acrylate were used. The amounts of solvent were retained.

EXAMPLE 2c

The procedure of Example 3c was used. 400 g of the adhesive composition 2 (50% strength solution) were mixed and homogenized with 9.90 g of triarylsulfonium hexafluorophosphate (Cyracure UVI-6990 ® [UNION CARBIDE]).

EXAMPLE 3

The procedure of Example 1 was used. For the polymerization, 40 g of tert-butyl acrylate and 360 g of n-butyl acrylate were used. The amounts of solvent were retained.

EXAMPLE 3a 400 g of the adhesive composition 3 (50% strength solution) were mixed with 6.60 g (5 mol percent) of triarylsulfonium hexafluorophosphate (Cyracure UVI-6990 ® [UNION CARBIDE]; 50% strength solution). Following homogenization, the adhesive composition was coated onto release paper, irradiated with UV light for 30 seconds and heated at 120° C. for 10 minutes. UV irradiation was carried out using the xenon chloride lamp (VIB 308 Bulb [FUSION]). The fraction of polyacrylic acid was determined using Test C.

EXAMPLE 3b

The procedure of Example 3a was used. 400 g of the adhesive composition 3 (50% strength solution) were mixed with 12.2 g (10 mol percent) of triarylsulfonium hexafluorophosphate (Cyracure UVI-6990 ® [UNION CARBIDE]; 50% strength solution).

EXAMPLE 3c

The procedure of Example 3a was used. 400 g of the adhesive composition 3 (50% strength solution) were mixed with 19.8 g (15 mol percent) of triarylsulfonium hexafluorophosphate (Cyracure UVI-6990 ® [UNION CARBIDE]; 50% strength solution).

EXAMPLE 3d

The procedure of Example 3a was used. 400 g of the adhesive composition 3 (50% strength solution) were mixed with 24.4 g (20 mol percent) of triarylsulfonium hexafluorophosphate (Cyracure UVI-6990 ® [UNION CARBIDE]; 50% strength solution).

EXAMPLE 3e

The procedure used was that of Example 3c. The UV exposure time was 6 seconds.

EXAMPLE 3f

The procedure used was that of Example 3c. The UV exposure time was 18 seconds.

EXAMPLE 3g

The procedure used was that of Example 3c. The UV exposure time was 45 seconds.

EXAMPLE 3h

The procedure used was that of Example 3c. The UV exposure time was 60 seconds.

EXAMPLE 3i

The procedure used was that of Example 3c. The UV exposure time was 90 seconds.

EXAMPLE 3j

The procedure used was that of Example 3c. The polyacrylate was heated for 30 minutes.

EXAMPLE 3k

The procedure used was that of Example 3c. The polyacrylate was heated for 60 minutes.

Results

A backing was coated with the acrylic PSA composition, which was irradiated with different doses of UV radiation. Deprotection was carried out at 120° C. or 140° C. It is possible to control the conversion through the choice of temperature and of the energy dose. The adhesive tests showed a distinct improvement in properties in respect of the shear strength. The UV-treated adhesive composition exhibited a significantly higher flow viscosity and a higher glass transition temperature $T_G$ than the untreated base composition.

The polymerizations carried out for characterization are summarized in Tab. 1.

TABLE 1

| Example | t-BuA [%] | 2-EHA [%] | MA [%] | n-BuA [%] |
|---------|-----------|-----------|--------|-----------|
| 1 | 9 | 81 | 10 | 0 |
| 2 | 5 | 75 | 20 | 0 |
| 3 | 10 | 0 | 0 | 90 | t-BuA = tert-butyl acrylate
2-EHA = 2-ethylhexyl acrylate
MA = methyl acrylate
n-BuA = n-butyl acrylate The molecular weight achieved in the case of Examples 1–3 was approximately 1,000,000. Since these polyacrylate adhesive compositions are intended to serve as a reference, Examples 1–3 were adhesion tested, especially in respect of the shear strength (see Table 3). Since without crosslinking polyacrylate compositions are not very cohesive, crosslinking was carried out beforehand by irradiation with electron beams of different intensity. Additionally, these compositions were analyzed by DMA in order to be able to compare the flow viscosities with one another.

In order to convert these nonpolar compositions into more polar compositions, Examples 1–3 were mixed with UV-cationic initiators. To check the applicability of this method, Example 3 was combined with different amounts by weight of Cyracure UVI 6990, coated onto a PET sheet backing and subjected to different doses of UV radiation.

The UV source used was a xenon chloride lamp (VIB 308 Bulb [FUSION]).

TABLE 2

| Example 3 | UV photoinitiator [mol %] | Exposure period [sec] | Drying period [min] at 120° C. | Conversion [%] by IR |
| --- | --- | --- | --- | --- |
| 3a | 5 | 30 | 10 | 76 |
| 3b | 10 | 30 | 10 | 93 |
| 3c | 15 | 30 | 10 | 98 |
| 3d | 20 | 30 | 10 | 98 |
| 3e | 15 | 6 | 10 | 32 |
| 3f | 15 | 18 | 10 | 46 |
| 3g | 15 | 45 | 10 | 98 |
| 3h | 15 | 60 | 10 | 98 |
| 3i | 15 | 90 | 10 | 98 |
| 3j | 15 | 30 | 30 | 98 |
| 3k | 15 | 30 | 60 | 98 |

The amount of photoinitiator, the exposure time and the drying time were varied. The degree of conversion was determined by means of IR spectroscopy (Test C). As a result of this analysis, the optimum reaction conditions for the tert-butyl acrylate deprotection in acrylic PSA compositions were found. Using 15 mol % of the photoinitiator triarylsulfonium hexafluorophosphate (Cyracure UVI-6990 ® [UNION CARBIDE]) with an exposure time of 30 seconds and heating at 120° C. for 10 minutes, a degree of conversion of 98% was achieved, based on the amount of tertiary butyl acrylate in the base polymer. The conversions were determined by means of IR spectroscopy. These results were confirmed by NMR spectroscopy measurements.

Following the determination of the reaction parameters, the adhesive compositions 1–3 were mixed with 15 mol % of triarylsulfonium hexafluorophosphate photoinitiator (Cyracure UVI-6990 ® [UNION CARBIDE]), coated onto a release paper backing, exposed for 30 seconds and heated at 120° C. for 10 minutes. Subsequently, the compositions were crosslinked using electron beams with a dose of 100 kGy, in order to increase the cohesion of the adhesive compositions. For reference, the base compositions 1–3 were likewise applied to the same release paper and crosslinked using electron beams with a dose of 100 kGy. In order to investigate the effect of the UV treatment, the PSA compositions were subjected to adhesive testing. The results are set out in Table 3:

TABLE 3

| Example | SST 10 N, RT [min] (Test A1) | SST 5 N, 70° C. [min] (Test A2) |
| --- | --- | --- |
| 1 | 90 | 15 |
| 2 | 64 | 23 |
| 3 | 88 | 26 |
| 1c | 10000 | 745 |
| 2c | 8732 | 537 |
| 3c | 10000 | 1102 |

SST: Shear stability times

The conversion of the nonpolar compositions 1–3 into the UV-treated and thus much more polar acrylic compositions 1 c–3c had a marked effect on the adhesive properties. As a result of the increase in the polyacrylic acid fraction from 0 to 5–10%, there was a distinct rise in the cohesion of the acrylic PSA compositions. The shear strength of the UV-treated adhesive tapes rose from less than 100 minutes to 8732 (2c) or 10 000 minutes (1c, 3c) with a loading weight of 1 kg. This can be explained by the formation of hydrogen bonds of the carboxylic acid groups. Moreover, the glass transition temperature $T_G$ is increased as a result of the conversion into the more polar acrylic PSA composition. This effect likewise influenced both shear tests. Following the UV treatment, there was also a marked increase in the shear stability times under heat. The values achieved are situated at the level of a cohesive PSA composition with very high shear strength. A further positive effect of this process is the ease of crosslinking in situ. Following the UV treatment, a gel value [weight fraction of the polymer that is insoluble in toluene) of 12% is measured for the deprotected adhesive composition. Therefore, under UV light and on heating, the carboxylic acid groups generated react with one another on the backing and so lead to precrosslinking. For the subsequent EBC crosslinking, a lower electron beam dose is generally required, which in turn prevents instances of damage to backings.

In order to underscore the hotmelt suitability of this process, DMA measurements were carried out on the starting polymer and on the end product, but prior to electron beam curing.

Dynamic mechanical analysis offers the possibility of determining changes in the glass transition temperature and in the flow viscosity. Compositions 1 and 1c were investigated by DMA and compared with one another (Test B). The results of the measurement are shown in FIG. 1.

Adhesive compositions 1 and 1c are uncrosslinked and differ in their dynamic $T_G$ (glass transition temperature). The glass transition temperature of 1 is situated at −28° C., whereas following UV treatment and heating (1c) the $T_G$ rises to −5° C. This is evidence in turn of the influence of the polyacrylic acid which forms as a result of UV rays.

Taking into account a molecular weight of 1,000,000 and the use of relatively nonpolar comonomers, very good extrudability is found for the starting polymer. As a result of the lower glass transition temperature, this composition can be processed in a concentrative extruder at relatively low temperatures and with a high throughput. As a result of the lower temperatures, there is virtually no damage to the polyacrylate, and the average molecular weight is retained. Moreover, the gelling which occurs at high temperatures is prevented. On the other hand, the polar adhesive composition generated on the backing, with a glass transition temperature of −5° C., is significantly more difficult to concentrate. The carboxylic acid groups formed in the adhesive composition form hydrogen bonds which cause the flow viscosity of this system to rise. This assumption was confirmed by DMA measurements. In the frequency sweep shown in FIG. 2, the flow viscosity of the adhesive compositions was determined at a constant temperature.

Figure 2:
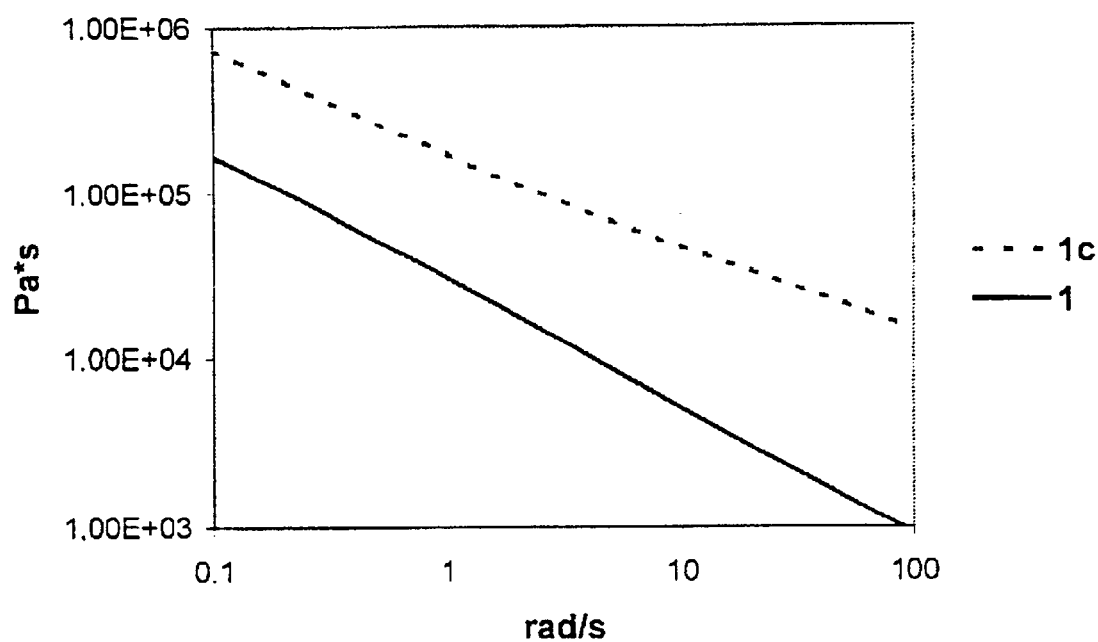

Following UV radiation, there is a marked increase in the flow viscosity of 1 (see FIG. 2). This corresponds in turn to the glass transition temperatures measured above. The increase in internal strength as a result of the formation of hydrogen bonds causes a significant increase in the flow viscosity. The adhesive composition generated on the backing would be able to be concentrated in the extruder only at very high temperatures.

Overall, this UV process is particularly suitable for the hotmelt technology for the preparation of high-viscosity acrylic PSA compositions of high shear strength from low-viscosity base acrylic compositions which are easy to process in a concentrative extruder.

What is claimed is:

1. An adhesive tape comprising a backing, and a pressure-sensitive adhesive applied to one or both sides of said backing, wherein the pressure-sensitive adhesive applied to at least one of said sides comprises:

a) one or more polyacrylate copolymers of the following monomers
      (a1) acrylic acid and/or acrylic esters of the following formula $CH_2=CH(R^1)(COOR^2)$, where $R^1$=H or $CH_3$ and $R^2$ is an alkyl chain having 1–20 carbon atoms, at 85–99% by weight based on component (a), and
      (a2) tert-butyl acrylate,
         at 1–15% by weight based on component (a);
   b) a photocationic initiator
      at 0.01–25% by weight based on The overall polymer mixture.

2. The adhesive tape of claim 1, wherein the pressure-sensitive adhesive further comprises up to 3% by weight based on the overall polymer mixture, of a difunctional or polyfunctional crosslinker.

3. The adhesive tape of claim 1, wherein component (a1) is present at 90–96–90%, and/or component (a2) is present at 4–10% by weight.

4. The adhesive tape of claim 3, wherein the pressure-sensitive adhesive further comprises up to 3% by weight, based an the overall polymer mixture, of a difunctional or polyfunctional crosslinker.

5. A method of bonding an adhesive tape to a substrate, said method comprising providing an adhesive tape according to claim 1, and bonding the adhesive tape to a substrate.

6. A method of bonding an adhesive tape to a substrate, said method comprising providing an adhesive tape according to claim 2, and bonding the adhesive tape to a substrate.

7. A method of bonding an adhesive tape to a substrate, said method comprising providing an adhesive tape according to claim 3, and bonding the adhesive tape to a substrate.

8. A method of bonding an adhesive tape to a substrate, said method comprising providing an adhesive tape according to claim 4, and bonding the adhesive tape to a substrate.

9. A pressure sensitive adhesive composition comprising a crosslinked polyacrylate obtained by crosslinking, induced by means of UV radiation of a polymer mixture comprising the following components:

(a) one or more polyacrylate copolymers of the following monomers
      (a1) acrylic acid and/or acrylic esters of the following formula $CH_2=CH(R^1)(COOR^2)$, where $R^1$=H or $CH_3$ and $R^2$ is an alkyl chain having 1–20 carbon atoms, at 85–99% by weight based on component (a), and
      (a2) tert-butyl acrylate,
         at 1–15% by weight, based on component (a), and
   (b) a photocationic initiator
      at 0.01–25% by weight based on the overall polymer mixture.

and further comprising up to 3% by weight based on the overall polymer mixture, of a difunctional or polyfunctional crosslinker.

* * * * *

UNITED STATES PATENT AND TRADEMARK OFFICE
CERTIFICATE OF CORRECTION

PATENT NO. : 6,703,073 B2
DATED : March 9, 2004
INVENTOR(S) : Husemann et al.

It is certified that error appears in the above-identified patent and that said Letters Patent is hereby corrected as shown below:

Column 9,
Line 38, "The overall" should read -- the overall --

Signed and Sealed this

Tenth Day of August, 2004

JON W. DUDAS
*Acting Director of the United States Patent and Trademark Office*